UNITED STATES PATENT OFFICE 2,466,501

PREPARATION OF ALPHA-BETA UNSATURATED MONOCARBOXYLIC ACID ESTERS

Thomas R. Steadman, Akron, Ohio, and Charles E. Feazel, Chevy Chase, Md., assignors to The B. F. Goodrich Company, New York, N. Y., a corporation of New York No Drawing. Application March 31, 1947, Serial No. 738,494

4 Claims. (Cl. 260—486)

This invention relates to a process for the preparation of esters of alpha-beta unsaturated monocarboxylic acids, and particularly to the preparation of esters of acrylic acid such as methyl acrylate.

In U. S. Patent 2,356,459, to Frederick E. Küng, an economical method of preparing lactones of beta-hydroxy monocarboxylic acids by the reaction of a ketene with a carbonyl compound such as an aldehyde or ketone is disclosed. The ease with which such lactones are now obtained makes it desirable to use these compounds as starting materials for the synthesis of other compounds including the alpha-beta unsaturated monocarboxylic acid esters, such as esters of acrylic acid. These esters are extremely valuable polymerizable materials for the production of synthetic rubbers and resins.

It is known that beta-lactones, and especially beta-propiolactone (also known as beta-hydroxy propionic acid lactone), may be reacted with an alcohol in the liquid phase and in the absence of a catalyst to form a beta-alkoxy carboxylic acid. Such acids are stable compounds except when heated in the presence of a strong acid dehydrating catalyst, in which case esters of alpha-beta unsaturated carboxylic acids are formed.

It is also known that acrylic acid esters may be prepared by heating beta-propiolactone together with an alcohol in the presence of a strong acid dehydrating catalyst and distilling the product.

We have now discovered that esters of acrylic acid may be prepared in a much more simple and efficient manner by passing a mixture of the vapors of beta-propiolactone and an alcohol over an activated carbon catalyst.

The reaction of beta-propiolactone with alcohols to yield acrylic acid esters according to this invention proceeds substantially as illustrated by the following equation:

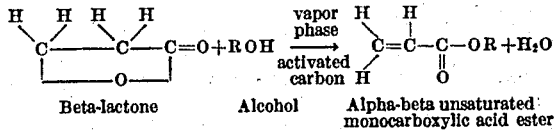

Beta-lactone    Alcohol    Alpha-beta unsaturated monocarboxylic acid ester wherein R represents an alcohol radical, particularly an alkyl radical.

The alcohol which is reacted with beta-propiolactone may be any alcohol composed only of carbon, hydrogen and oxygen atoms, such as methyl alcohol, ethyl alcohol, propyl alcohol, n-butyl alcohol, hexyl alcohols, heptyl alcohols, octyl alcohols, nonyl alcohols, n-decyl alcohol, n-undecyl alcohol, cetyl alcohol, n-dodecyl alcohol, n-tetradecyl alcohol and other primary alkyl alcohols, as well as sec.-butyl alcohol, tert.-butyl alcohol, allyl alcohol, beta-ethoxy-ethyl alcohol, diethylene glycol monoethyl ether, cyclohexanol, furfuryl alcohol, benzyl alcohol, ethylene glycol and other alcohols which are in the vapor phase within the temperature range at which the reaction is conducted.

The temperature at which the reaction is conducted may be varied considerably above that temperature at which both reactants are in the vapor phase. Thus, in general, temperatures above 150° C. and up to about 300° C. and even higher, are operative. The preferred temperature range is from 150° C. to 200° C. since at the higher temperatures there is a greater tendency for polyester formation by both the beta-propiolactone and the acrylate ester with a proportionately decreased yield.

The quantities of reactants are not critical and may be varied within wide limits. In general, an excess of the alcohol is preferred and the best yields are obtained when the molar ratio is approximately 5 to 1; that is, five moles of the alcohol to one mole of beta-propiolactone, but a ratio of from 1 to 10 moles of alcohol or even higher to 1 mole of beta-propiolactone may be used with good results.

The activated carbon used as a catalyst may be any of the various types known, such as bone charcoal, wood charcoal, and mineral charcoal.

The quantity of catalyst used is subject to considerable variation and is not critical. However, it is desirable to use a relatively large amount of catalyst so that a large contact area will be present over which the reactant vapors must pass. The amount of catalyst to be used, therefore, depends primarily on the quantities of reactants and the speed at which the reaction is conducted. The preferred particle size of the catalyst is from 10 mesh to 3 mesh, since smaller particles tend to retard the flow of reaction vapors, thus increasing the tendency for polymer formation in the reaction chamber.

The reaction of beta-propiolactone with alcohol to yield an ester of acrylic acid is best carried out in a horizontal reaction chamber or one inclined at a slight angle from the horizontal, the chamber being maintained at the desired reaction temperature. The catalyst is supported at the entrance and exit ends of the reaction chamber by glass or ceramic packing which at the entrance end also serves as a preheat area. The reactants are then slowly introduced into the reaction chamber. It is desirable to pass a current of nitrogen through the chamber during the reaction and for a short time thereafter so that the passage of the reactants through the chamber is assured. The vapors then pass into a water-cooled condenser and the reaction mixture is fractionated through a column from which the acrylate ester is recovered. It is desirable that a substance which prevents polymerization of the acrylate ester be present in the mixture during fractionation. Suitable substances for this purpose include copper, copper salts, hydroquinone, catechol, phenyl-beta-naphthylamine, and other well-known polymerization inhibitors.

The first passage of a reaction mixture over a new catalyst charge does not give a true yield of the acrylate ester since a quantity of the reaction mixture is absorbed in conditioning the catalyst. However, in subsequent runs over the conditioned catalyst charge, the amount of absorption is negligible and true yields of the ester are obtained.

The following examples will illustrate the practice of the invention, but are not intended to limit the invention thereto, for numerous modifications in the particular compounds and conditions employed will be obvious to those skilled in the art. All parts are by weight.

Example I

A gaseous mixture of 36 parts (0.5 mole) of beta-propiolactone and 78.9 parts (1.7 moles) of ethyl alcohol were introduced into a reaction chamber maintained at a temperature of 250° C. and containing 205 parts of activated charcoal. The time of reaction was 190 minutes. A steady flow of nitrogen was maintained through the reaction chamber to insure the continuous movement of the reactants through the chamber. 2 parts of hydroquinone were then added to the reaction product and the mixture fractionated. 26 parts (48%) of pure ethyl acrylate (B. P. 98.5° C.) were obtained.

Examples II to IX

In each of these examples a gaseous mixture of 36 parts (0.5 mole) of beta-propiolactone and 79.4 parts (2.5 moles) of methyl alcohol was introduced into a reaction chamber heated to a constant temperature, and a current of nitrogen maintained to insure movement of the reactants through the chamber. 2 parts of hydroquinone were then added to the reaction product and the mixture fractionated to yield pure methyl acrylate. The reaction temperature, the time of reaction, the amount of activated carbon used as a catalyst, and the percent yield of methyl acrylate are shown in the following table:

| Example | Temp. | Amount of Activated Carbon | Reaction time | Yield |
|---|---|---|---|---|
|  | °C. | Parts | Minutes | Percent |
| II | 200 | 137 | 185 | 62 |
| III | 175 | 136 | 190 | 71 |
| IV | 175 | 140 | 185 | 73 |
| V | 175 | 135 | 180 | 79 |
| VI | 175 | 136 | 189 | 67 |
| VII | 170 | 135 | 190 | 70 |
| VIII | 170 | 136 | 170 | 68 |
| IX | 170 | 136 | 190 | 65 |

When other surface active catalysts such as activated alumina or silica gel are used both the yield of the acrylate ester and the catalyst life are substantially reduced. This is due to excessive tar formation on the catalyst. Thus, when silica gel was used as the catalyst using the same conditions as Examples VII and IX, yields of only 48% and 55% respectively were obtained.

By using the catalyst of this invention, the very desirable feature of long catalyst life is also obtained. Accordingly, the same catalyst may be used for as many as twenty or more runs, and upon reactivation with steam, the activity is renewed.

When the above examples are repeated using the other alcohols mentioned hereinabove in place of those specifically set forth, other esters of acrylic acid are obtained.

Moreover, esters of other alpha-beta unsaturated monocarboxylic acids are secured when other beta-lactones having a hydrogen atom on the alpha-carbon atom are used in place of beta-propiolactone. Among these are homologs of beta-propiolactone, that is, other beta-lactones of saturated aliphatic monocarboxylic acids, and other compounds of the following general formula:

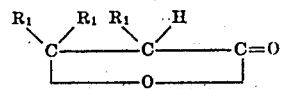

wherein $R_1$ is either hydrogen or a hydrocarbon radical. Examples of these beta-lactones are: alpha-methyl propiolactone, which yields methacrylic acid esters, alpha-ethyl-beta-propiolactone which yields ethacrylic acid esters, alpha-isopropyl-beta-propiolactone which yields alpha-isopropyl acrylic acid esters, alpha-butyl-beta-propiolactone which yields alpha-butyl acrylic acid esters, beta-butyrolactone which yields crotonic acid esters, alpha-methyl beta-butyrolactone which yields tiglic acid esters, and the like.

The preferred compounds to be used in the practice of this invention are beta-propiolactone and the unsubstituted aliphatic primary alcohols particularly those containing fewer than five carbon atoms. Accordingly, the preferred embodiments of this invention include the reaction of beta-propiolactone with methyl, ethyl, propyl or butyl alcohol to produce the methyl, ethyl, propyl or butyl ester of acrylic acid.

Numerous other modifications and variations in the invention described herein will be apparent to those skilled in the art and are within the spirit and scope of the appended claims.

We claim:

1. A method for preparing an ester of an alpha-beta unsaturated monocarboxylic acid which comprises continuously passing vapors of a mixture of a beta-lactone having a hydrogen atom on the alpha carbon atom and an alcohol composed only of carbon, hydrogen, and oxygen atoms at a temperature of from 150° to 300° C. through a reaction chamber in contact with an activated carbon catalyst.

2. A method for preparing an ester of acrylic acid which comprises continuously passing vapors of a mixture of beta-propiolactone and a primary alcohol composed only of carbon, hydrogen, and oxygen atoms at a temperature of from 150° to 200° C. through a reaction chamber in contact with an activated carbon catalyst.

3. A method for preparing methyl acrylate which comprises continuously passing vapors of a mixture of beta-propiolactone and methyl alcohol at a temperature of from 150° to 200° C. through a reaction chamber in contact with an activated carbon catalyst.

4. A method for preparing ethyl acrylate which comprises continuously passing vapors of a mixture of beta-propiolacetone and ethyl alcohol at a temperature of from 150° to 200° C. through a reaction chamber in contact with an activated carbon catalyst.

THOMAS R. STEADMAN.
CHARLES E. FEAZEL.

REFERENCES CITED

The following references are of record in the file of this patent:

UNITED STATES PATENTS

| Number | Name | Date |
|---|---|---|
| 2,376,704 | Kung | May 22, 1945 |

FOREIGN PATENTS

| Number | Country | Date |
|---|---|---|
| 496,372 | Germany | Apr. 24, 1930 |